(12) United States Patent
Nolte et al.

(10) Patent No.: US 11,573,031 B2
(45) Date of Patent: Feb. 7, 2023

(54) TANKLESS WATER HEATER AND METHOD OF CONTROLLING A TANKLESS WATER HEATER

(71) Applicant: Stiebel Eltron GmbH & Co. KG, Holzminden (DE)

(72) Inventors: Hubert Nolte, Höxter (DE); Martin Herrs, Höxter (DE)

(73) Assignee: Stiebel Eltron GmbH & Co. KG, Holzminden (DE)

( * ) Notice: Subject to any disclaimer, the term of this patent is extended or adjusted under 35 U.S.C. 154(b) by 789 days.

(21) Appl. No.: 15/378,720

(22) Filed: Dec. 14, 2016

(65) Prior Publication Data

US 2018/0119988 A1 May 3, 2018

(51) Int. Cl.
  *F24H 1/10* (2022.01)
  *F24H 9/20* (2022.01)
  *G05D 23/19* (2006.01)

(52) U.S. Cl.
  CPC .............. *F24H 1/106* (2013.01); *F24H 1/103* (2013.01); *F24H 9/2028* (2013.01); *G05D 23/1931* (2013.01)

(58) Field of Classification Search
  CPC .................................. F24H 1/106; F24H 1/10
  USPC ................... 392/316, 318; 219/494, 497, 501
  See application file for complete search history.

(56) References Cited

U.S. PATENT DOCUMENTS

| | | | | |
|---|---|---|---|---|
| 4,093,847 A | * | 6/1978 | Walker | F24H 9/2028 392/318 |
| 4,262,191 A | * | 4/1981 | Lepper | F22B 1/30 236/440 |
| 5,325,822 A | * | 7/1994 | Fernandez | F24H 1/102 219/486 |
| 7,050,706 B2 | * | 5/2006 | Israelsohn | F24H 1/106 392/316 |

FOREIGN PATENT DOCUMENTS

| | | |
|---|---|---|
| CN | 104897969 | 9/2015 |
| DE | 3 8 40 2010 | 5/1990 |

(Continued)

OTHER PUBLICATIONS

Machine Translation of DE202004012263 (Year: 2019).*

*Primary Examiner* — Tu B Hoang
*Assistant Examiner* — Thomas J Ward
(74) *Attorney, Agent, or Firm* — Haug Partners LLP (57) ABSTRACT

A tankless water heater comprising a bare wire heating element is disclosed which is connected to an electronic temperature control system. At least one sensor is furthermore connected to the electronic temperature control system. A fluid heating chamber is made of insulating non conductive material wherein the heating element is located. At least one switch is connected to at least one bare wire heating element and to a phase of an AC line. An electrode system and an electronic detecting circuit are interconnected. The electrode system is arranged in a fluid channel, in a short distance from the bare wire heating element which acts like electrode 1. The electrode 2 of the electrode system (Continued)

is made from a conductive tube material hydraulically connected to a throttle valve made from non conductive material to insulate the electrode 2 from the grounded collector. The electrode 2 is electrically connected to a electronic control system via a conductive material.

14 Claims, 5 Drawing Sheets

(56) References Cited

FOREIGN PATENT DOCUMENTS

| DE | 20 2004 012263 | | 10/2004 | | |
|---|---|---|---|---|---|
| DE | 202004012263 | * | 10/2004 | ............. | F24H 1/102 |
| DE | 20 2013 002 277 | | 7/2014 | | |
| WO | WO 2014/098943 | | 6/2014 | | |

* cited by examiner

TANKLESS WATER HEATER AND METHOD OF CONTROLLING A TANKLESS WATER HEATER

The present application claims priority from German Patent Application No. 10 2016 013 0520.0 filed on Oct. 27, 2016, the disclosure of which is incorporated herein by reference in its entirety.

BACKGROUND OF THE INVENTION

The present invention relates to a tankless water heater and a method of controlling a tankless water heater.

It is noted that citation or identification of any document in this application is not an admission that such document is available as prior art to the present invention.

Tankless water heaters supply domestic hot water without any standby losses, because they heat water only when hot water is on demand. Tankless electric water heaters are state-of-the-art, equipped with an electronic temperature control system using sensor information from at least one temperature sensor and/or a flow proportional sensor which provide information to the electronic control system on a printed circuit board. Such tankless water heater systems, also referred to as "on demand water heater systems", can often provide a more energy efficient way to produce domestic hot water than storage tank systems. Tankless water heaters save energy because they do not need to constantly heat water in a large storage tank which avoids thermal losses. To achieve this, tankless water heaters can instantaneously heat water as it is passing from the consumer's water supply to the outlet (e.g. faucet or showerhead). The tankless water heater, therefore, needs to "notice" when hot water is on demand in order to heat the incoming cold water properly. Flow switches can be used in tankless water heaters to detect a tapping event if the consumer desires hot water. Briefly, when a consumer turns on a faucet or a dishwasher, any hot-water-requiring device, water flows from the water supply through the tankless water heater system. This flow of water causes the flow switch to activate the electric heating element of the tankless water heater. This has already been described, for instance, in DE 20 2013 002 277 or DE 38 40 210 A1.

In order to be able to control the outcoming water temperature of a tankless water heater can be equipped with different modular devices like flow sensors, check valves, a heat exchanger assembly, incoming and outgoing tube sections which can be plugged into the main circuit board like it is described in DE 20 2004 012263 U1.

Modern tankless water heating devices are equipped with either a bare wire heating element or with a metal sheathed heat element. For a bare wire heating element system in particular there is a risk of overheating the element wire if air bubbles are coming into the unit with the cold water supplied to the heating chamber where the element heats the water. It is also known to monitor the electric conductivity of the water in order to avoid an electric shock if the conductivity of the water is more than a permitted threshold value.

CN 104897969 describes a method and device for detecting conductivity in an instant electric water heater. The measurement device comprises at least two sensing electrodes for being arranged in a water guiding channel separately; a measurement electronic device for providing and analyzing electrical signals influenced by the conductivity of the water; and a transformer, wherein the measurement electronic device is connected to a primary side of the transformer, and the two sensing electrodes are connected to a secondary side of the transformer, so that the measurement electronic device is allowed to be coupled with the sensing electrodes through the transformer. The measurement electronic device provides a primary-side alternating voltage signal on the primary side of the transformer according to rules, so that a secondary-side alternating current passing through the sensing electrodes and the water is set on the secondary side of the transformer according to the conductivity of the water, and the secondary-side alternating current influences the current of the primary side on the primary side of the transformer; and the measurement electronic device measures the current of the primary side for determining the conductivity of the water.

WO 2014/098943 A1 describes a tankless water heater with a bare wire element wherein the heating chamber contains an optical sensor to detect the overheating and glowing of the element wire.

If the water supplied to the unit contains air bubbles, the amount of heat transferred from the element to the water is reduced immediately. This is because the thermal heat conduction of air is 20-25 times lower than the thermal heat conduction of the water flow. If air bubbles pass through the heating chamber, the cooling of the element is reduced, which reduces the durability of the element dramatically.

Another disadvantage of a single optical sensor type dry fire protection is the fact that the overheating of the wire may happen in multiple locations, making the damage worse in some locations that cannot be directly observed.

SUMMARY OF THE INVENTION

It is an objective of this invention to provide a tankless water heater and corresponding method which allow for a reliable overheating protection and avoid the need for any additional sensors.

This object is solved by a tankless water heater, comprising a bare wire heating element, which is connected to an electronic temperature control system. At least one sensor is furthermore connected to the electronic temperature control system. A fluid heating chamber is made of insulating non conductive material wherein the heating element is located. At least one switch is connected to at least one bare wire heating element and to a phase of an AC line. An electrode system and an electronic detecting circuit are interconnected. The electrode system is arranged in a fluid channel, in a short distance from the bare wire heating element which acts like electrode 1. The electrode 2 of the electrode system is made from a conductive tube material hydraulically connected to a throttle valve made from non conductive material to insulate the electrode 2 from the grounded collector. The electrode 2 is electrically connected to a electronic control system via a conductive material.

The invention also relates to a method of controlling a tankless water heater, comprising the step of detecting fluid parameters with at least one sensor. The flowing water is heated with at least one heating element dependent on fluid parameters. The heat capacity of the heat element is controlled with a signal of at least one sensor. The electric power supply to the heating element is adjusted continuously as required. At least one phase of an AC line is connected with a switch to at least one heating element. The actual flow rate is continuously detected with a sensor to control the heat capacity of the heat element. The electrode 2 is connected to an electronic leak detection measuring circuit and to a reference pole wherein the leak current flow is routed to the said reference pole to monitor a water conductivity.

One aspect of the invention is to situate the flow sensor between the heating element and the plug-in electrode for flow rate detection.

According to this aspect of the invention the electrode is one module of a modular system consisting further in a circuit board, a heat exchanger, a flow control unit and a throttle valve.

According to this aspect the electrode is designed like a plug-in tube for cooling electric components. The electrode is made from material with good thermal and electric conductivity.

According to this aspect the measured values can be used for at least one safety function.

According to a further aspect the fluid flow rate is automatically controlled or adjusted, if necessary, via a throttle valve and (state-of-the-art electronic) a controller to maintain set point temperature.

According to a further aspect of the invention it is described to protect overheating of the bare wire heating element by using a leak current measurement for an air bubble detection. The amount of leak current emitted by the energized bare wire into the water depends on the conductivity of the water, the inner diameter and length of the tube, the water temperature and the amount of air bubbles in the system. The measured amount of leak current using a detection circuit depends, beside the named parameters, on the distance between, and size, of both electrodes. The bare wire element itself acts as one electrode and a very conductive non-grounded part of the hydraulic system acts as the second electrode. A conductive leak current collector which is in contact with the water creates the electrical 0-potential on which the measurement of the leak current is based on.

It is possible that interferences caused by different earth potential from other grounded external sources of the installation influence the measurement of the leak current in a unwanted way. Those interferences are mainly derived by the grounded leak current collector. The remaining interferences have a inferior influence on the measurement result of the leak current inside the water heater.

According to a further aspect a tankless water heater is provided, comprising: a fluid channel for guiding a fluid from an inlet to an outlet, an electronic control system, a bare wire heating element acting as a first electrode which is connected to the electronic control system, the fluid channel including a fluid heating chamber and a second electrode, wherein the fluid heating chamber comprises insulating material and the bare wire heating element is located within the fluid heating chamber, wherein the second electrode is provided, in particular removeably fitted, at a distance from the bare wire heating element acting as the first electrode, the electronic control system including an electronic leak current detecting circuit for detecting a value indicative of the conductivity of a fluid in the fluid channel between the first electrode and the second electrode, wherein the electronic leak current detecting circuit is connected by a wire to the second electrode and a reference pole, respectively, wherein the electronic leak current detecting circuit is configured to derive the value indicative of the conductivity of the fluid based on a current leaking from the first electrode.

In an embodiment the electronic control system is configured to detect any presence of air bubbles between the bare wire heating element and the second electrode based on the value indicative of the conductivity of the fluid.

In an embodiment the tankless water heater further comprises an electric charge storing device, which is connected to the electronic leak current detection circuit, and a signal transmission unit, which includes a transmission device for transmitting a charging status of the electric charge storing device to the electronic leak current detection circuit of the electronic control system, wherein the electronic leak current detecting circuit is configured to derive the value indicative of the conductivity of the fluid based on the charging status.

In an embodiment the electronic control system is configured to determine an amount of air bubbles between the bare wire heating element and the second electrode based on a change in the charging status, preferentially based on a time needed for charging the electric charge storing device.

In an embodiment the electric charge storing device comprises a rectifying circuit for rectifying an alternating leak current applied to the second electrode and for directing the direct current loads the electric charge storing device.

In an embodiment the electronic control unit is configured to monitor the water conductivity and to at least one of activate an alarm signal and shut off power supply to the bare wire heating element if the conductivity value exceeds a threshold value.

In an embodiment the tankless water heater further comprises at least one sensor which is connected to the electronic control system, wherein the at least one sensor comprises at least one of a flow detection sensor for a flow detection of the fluid in the fluid channel, a temperature sensor for detecting outgoing hot water to control the temperature of the outgoing water, and a temperature sensor, for detecting an incoming cold water temperature, wherein the electronic control unit is configured to evaluate the value indicative of the conductivity of the fluid based on a value sensed by the at least one sensor.

In an embodiment the electrode is hydraulically connected to a valve in the fluid channel, and wherein the said valve is an electronically controlled throttle valve to adjust the flow rate, preferentially to automatically adjust the flow rate.

In a further aspect a tankless water heater is provided, comprising: an electronic temperature control system, a bare wire heating element acting as a first electrode which is connected to an electronic temperature control system, at least one sensor which is connected to the electronic temperature control system, a fluid heating chamber made of insulating material wherein the heating element is located, at least one switch which connects the at least one bare wire heating element to a phase of an alternating current (AC) line, a second electrode, an electronic leak current detecting circuit which is in connection to the second electrode, and a fluid channel, wherein the second electrode comprises a plug-in tube which is configured to be fitted in the fluid channel at a distance from the bare wire heating element, wherein the second electrode is hydraulically connected to a valve and electrically connected to the electronic temperature control system via a wire.

In an embodiment the tankless water heater further comprises a reference pole, which is connected to the electronic leak current detection circuit, an electric charge storing device, which is connected to the electronic leak current detection circuit, and a signal transmission unit which has a transmission device to the electronic temperature control system.

In an embodiment said electrode comprises a cooling tube for an electronic device, in particular for power electronics.

In an embodiment said reference pole is grounded and connected to a ground pole.

In an embodiment the said signal transmission unit comprises an optic coupling element to transfer information wirelessly.

In an embodiment the at least one sensor comprises at least one of a flow detection sensor for a flow detection of the fluid in the fluid channel, a temperature sensor for detecting outgoing hot water to control the temperature of the outgoing water, and a temperature sensor, for detecting an incoming cold water temperature.

In an embodiment the said valve is an electronically controlled throttle valve to automatically adjust the flow rate.

According to a further aspect a method of controlling a tankless water heater is provided, wherein the tankless water heater comprises a fluid channel for guiding a fluid from an inlet to an outlet, an electronic control system, a bare wire heating element acting as a first electrode which is connected to the electronic control system, the fluid channel including a fluid heating chamber and a second electrode, wherein the fluid heating chamber comprises insulating material and the bare wire heating element is located within the fluid heating chamber, wherein the second electrode is provided, in particular removeably fitted, at a distance from the bare wire heating element, the method comprising: measuring a leak current between the bare wire heating element and the second electrode using an electronic leak detection measuring circuit, and deriving a value indicative of the conductivity of fluid in the fluid channel based on the measured leak current.

In an embodiment the method further comprises detecting at least one of a water inlet temperature, a water outlet temperature and an actual water flow rate with a sensor, and evaluating the value indicative of the conductivity under consideration of the detected at least one of the water inlet temperature, the water outlet temperature and the actual water flow rate.

In an embodiment the method further comprises the following steps: detecting fluid parameters with at least one sensor, heating the water with at least one bare wire heating element to preset parameters, controlling continuously as required the conditions of the outcoming water by a signal of the at least one sensor, wherein the controlling comprises: (i) to connect at least one phase of an alternating current line with a switch to at least one bare wire heating element as soon as water flows, (ii) to measure the leak current with the electronic leak detection measuring circuit which is connected to the second electrode by detecting a charge of an electric charge storing device which is electrically fed by a direct current, wherein the direct current is generated by rectifying an alternating leak current applied to the second electrode and the direct current loads the electric charge storing device.

In an embodiment the method further comprises the following steps: detecting fluid parameters with at least one sensor, heating the water with at least one heating element to preset parameters controlled with a signal of at least one sensor, and adjusting continuously as required the conditions of the outcoming water as follows: (i) to detect the actual water flow rate with a sensor, (ii) to detect any presence of air bubbles between at least one bare wire heating element and the plug-in electrode, wherein the second electrode is connectable to the electronic leak detection measuring circuit and to a reference pole via the electronic leak detection measuring circuit, wherein a leak current is routed to the reference pole to calculate water conductivity, wherein the presence of air bubbles is detected based on the water conductivity.

In an embodiment the method further comprises feeding the leak current to an electric charge storing device, monitoring a characteristic value of a charge of the electric charge storing device and deactivating the electric supply to a bare heating wire as soon as the characteristic value exceeds a limit.

In an embodiment the method further comprises detecting air bubbles in the fluid channel of the water heater to avoid overheating of the bare wires by analyzing the characteristic value, which is representative of a fluctuating water conductivity and temperature in order protect the heating element.

In an embodiment the method further comprises maintaining a set point temperature by automatically controlling and adjusting, if necessary, a throttle valve and state-of-the-art electronics.

In an embodiment the method further comprises a safety function implementing at least one of the following steps: (i) monitor the water conductivity and to activate an alarm signal if the conductivity value exceeds a first threshold value, (ii) monitor the water conductivity and to shut off the electric element supply of the water heater if the conductivity value exceeds a second threshold value above the first threshold value, and (iii) monitor the water conductivity, even when the bare wire heating element is switched off, and to shut off the electric supply immediately if the detected leak current exceeds a third threshold value.

In an embodiment the method further comprises monitoring a water flow rate and temperature in order to at least one of a) to activate or b) to deactivate the electric power supply to the bare wire heating element and to calculate a power demand for at least one bare wire heating element depending on flow rate and a preset water temperature.

DETAILED DESCRIPTION OF EMBODIMENTS

It is declared that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
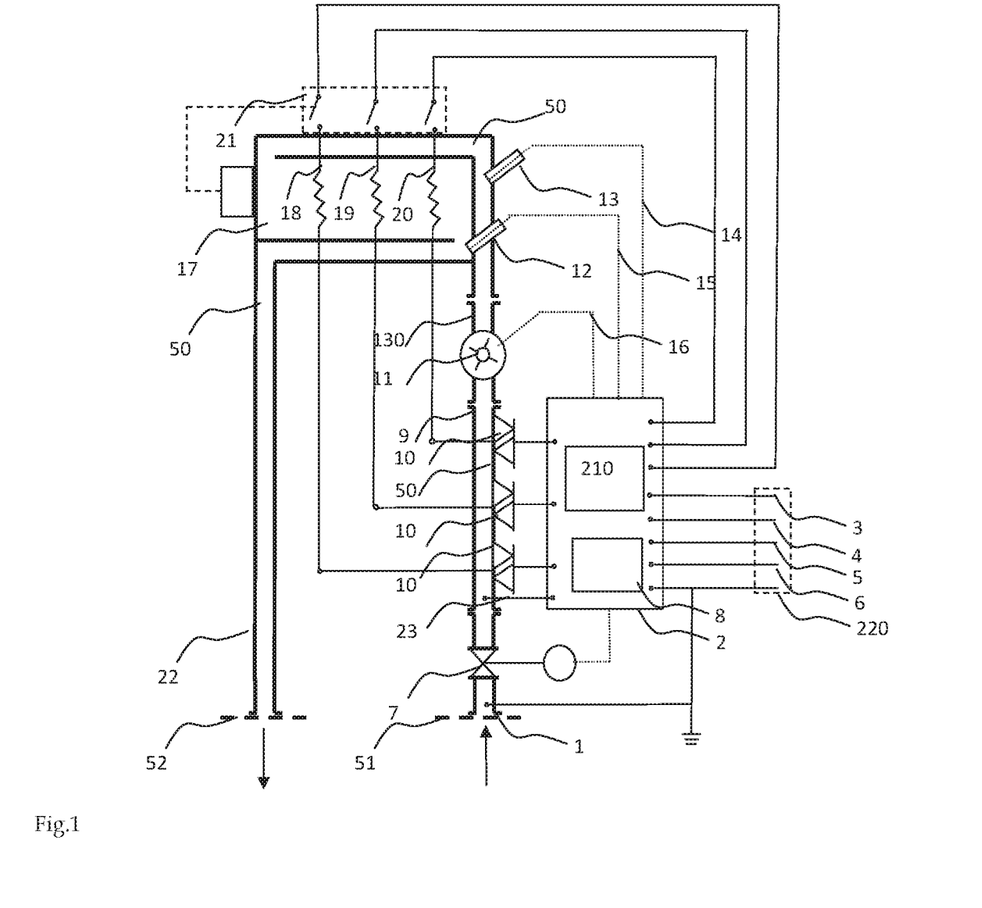
FIG. 1 shows a schematic representation of a tankless water heater according to a first embodiment.

FIG. 1 shows a schematic representation of a tankless water heater 100 according to a first embodiment. The incoming cold water enters the tankless water heater 100 on position 51 and is routed along the channel flow system 50 to the end of the channel flow system outlet 52. A cold water inlet tube 1 is in electrically conductive contact with the ground potential of the electronic control system 2. The electronic control system 2 is connected to an electric grid using the wires 3-6. The cold water inlet tube 1 is also in conductive contact with a grounded block 220. The plug-in motor driven throttle valve 7 is controlled by the microprocessor 8 which is integrated on the electronic control system 2. The housing material of the throttle valve 7 provides a non-conductive connection between the named throttle valve 7 and the grounded cold water inlet tube 1. This is to reduce the unwanted influence of incoming electric earth potential from different other grounded external sources of the installation system on the measured leak current signal.

Instead a throttle valve any other non conductive material connector is possible.

A plug-in tube 9 cools at least one triac device 10 in order to generate a defined cooling capacity. The tube material provides a proper thermal conductivity having enough cooling capacity for the at least one triac 10 by the passing cold water, and acts like an electrode for the leak current.

A plug-in flow sensor device 11 is integrated in an incoming cold water tubing. In this embodiment of the invention the flow sensor 11 is located in a flow section 130 downstream behind the plug-in tube 9. A water flow information comes from a water driven rotating wheel inside the flow sensor device 11.

The flow sensor device 11, an outgoing hot water temperature sensor device 12, and an incoming cold water temperature sensor 13 are connected to the electronic control system 2 using a wiring 14, 15, 16. The bare wire elements 18, 19, 20 are connected via the triac devices 10 to the electronic control system 2. The bare wire elements 18, 19, 20 are installed in a heat exchanger device 17. For safety reasons, there is a manually resettable safety thermal cut-out 21 to cut off an electric supply to the heating element, if needed. The safety cut-off 21 is in thermal contact to the heat exchanger 17.

Downstream of the heat exchanger 17 there is a tube 22 where the heated water leaves the assembly. A wire 23 provides a conductive connection between the plug-in tube 9 and the electronic control system 2 to feed a leak current to the electronic control system 2.

A water temperature setting can be done using a knob or user interface which is integrated on the electronic control system 2, connected to the electronic control system 2 or connected by wire ore wireless to an external device like a display or mobile device. All devices, the knob, the display and the mobile or external device are not shown in FIG. 1.

The incoming cold water passes the inlet tube 1 and the throttle valve 7. The throttle valve 7 is completely open if the heating capacity of the tankless water heater is sufficient to heat the water flow of cold water, as picked up by the inlet sensor 13, up to a set point water temperature entered by the user and monitored by the outlet sensor 12. If a temperature difference between the incoming cold water temperature and the set point temperature is more than the water heater is capable of providing, the throttle valve 7 closes slightly in order to reduce the water flow. In this embodiment of the invention the throttle valve 7 is driven by an electric motor. In other words, if the water flow rate is greater than what the heater 100 can provide, dependent to a given outlet temperature setting, the throttle valve 7 adjusts the flow rate in order to maintain that set point temperature.

A regulation of the throttle valve 7 is at least monitored and controlled by the electronic control system 2 in combination with the flow sensor 11, temperature sensor 12 and the set point temperature as entered by the user.

The supplied heating capacity of the element 18, 19, 20 could be controlled if a firing rate of the triac 10 is controlled by the electronic control system 2.

Figure 2:
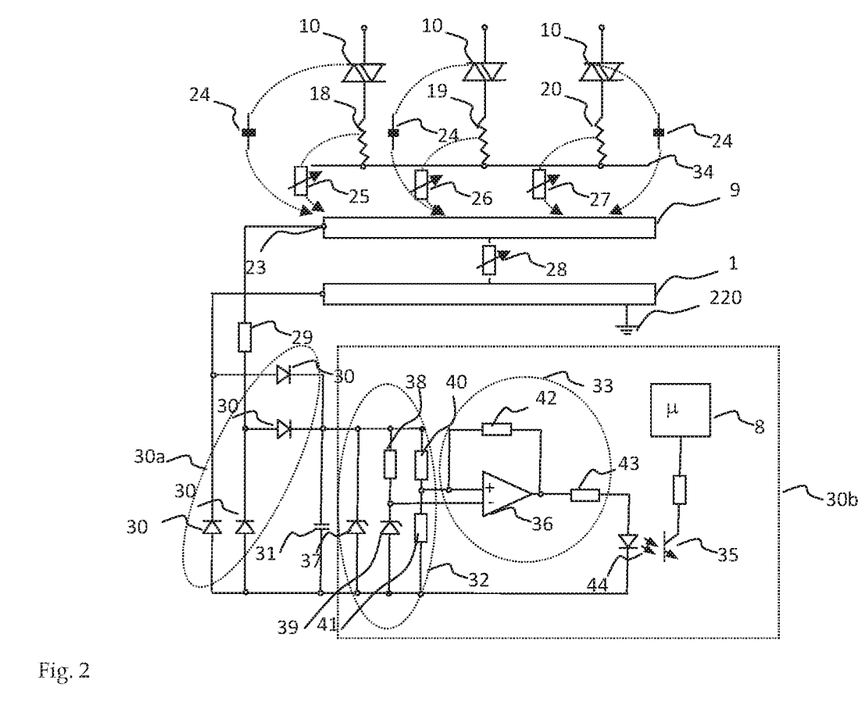
FIG. 2 shows a schematic representation of the integrated circuit with signal and data flow.

FIG. 2 shows the method and the circuit integrated on the electronic control system 2 to measure the leak current of the bare wire heated tankless water heater.

The triac 10 feeds the bare wire elements 18, 19, 20 with electric power. A power rate is controlled by the electronic control system 2 as a result of a close loop system in order to keep the temperature of the outlet water close to the set point temperature entered by the user.

All heating elements are wired on one end to a common "floating" reference 34. A capacitive coupling of alternating active potential from the triac insulating material to the plug-in tube 9 creates a unwanted capacitive current 24 which is transferred to the electrode plug-in tube. This is why the hot triac devices are in a very close thermal conductive contact to the cold plug-in tube electrode 9. If there is a alternating voltage potential between the triac gate and the insulation layer a capacitive current is transferred into the electrode plug-in tube 9. Each heat element 18,19, 20, has a different regional distance to the electrode plug-in tube 9. Each heat element releases a different leak current represented by the different resistance 25,26,27 into the water. The element with the closest regional distance to the electrode plug-in tube 9 provides the major amount of leak current.

A variable resistance 28 is the result of the leak current between plug-in electrode 9 and the grounded tube 1 which acts like a reference potential for a detection circuit such as a detection circuit 210 as depicted, for instance, in FIG. 1. The resistance 28 depends also on the amount of air bubbles delivered with the water downstream to the heat exchanger 17, with the bare wire elements 18, 19, 20. The leak current path with the shortest distance from the heat element to the plug-in tube 9 provides the major amount of leak current.

FIG. 2 shows a principle detection circuit for the leak current. The circuit may be part of the electronic control system 2 or part of an additional electronic control system. The leak current electrode 9 is connected to the electronic control system 2 via the wire 23. The leak current passes the resistor 29 and is rectified via the diodes 30 which are in a rectifier bridge connection 30*a*.

Due to the fact that potable water has a wide spectrum of conductance, the leak current can be very low, for example 0.3 mA at 4 V, if the supply voltage of the element is on grid voltage.

A rectifier 30 *a* transforms the AC into DC current to charge a capacitor 31. The actual charge of the capacitor 31 depends on the balance of outgoing current which feeds finally the LED 44 of the optocoupler 35 and the incoming current from electrode plug-in tube 9. The voltage across the capacitor 31 is proportional to its charge. The capacitor 31 is connected to the detection circuit 30*b* and supplies 30*b* with electric energy. Part 32 defines first a stabilized threshold value with resistor 38 and Zener diode 39 and second a reference value with a voltage divider consisting on resistor 40 and 41. The reference value is proportional to the supply voltage across the capacitor 31. The opamp 36 compares the reference value with the threshold value. As soon the reference value is more than the stabilized threshold value the opamp 36 acts like a comparator and switches its output to supply voltage and the LED 44 of the optocoupler 35 is activated. The resistor 42 acts like a positive feedback system with switch hysteresis to keep the LED 44 activated as long the reference value is more than the threshold value plus switch hysteresis. The comparator is switch off as soon the reference value declines at least in the range of the amount of switch hysteresis below the threshold value. The goal of the detection circuit is it to provide a pulsed signal to the optocoupler 35 with sufficient duration wherein the pulse pause pattern is proportional to the incoming leak current.

The conductivity of drinking water ranges from 50 yS/cm (similar to rain water) to 50 mS/cm (similar to salt water). This requires a detection circuit with a sufficient accuracy in a wide range of water conductance constitution. Due to the fact that the capacitor 31 acts like a charge collector even for water with low conductivity (low incoming current) it is possible to detect low conductive water accurate in a wide dynamic range, and to provide enough energy to activate the LED 44 of the optocoupler 35 even if the supplied leak current is low due to low conductive water constitution. The pulse pause pattern of the optocoupler is transferred to the microcontroller 8.

Figure 3:
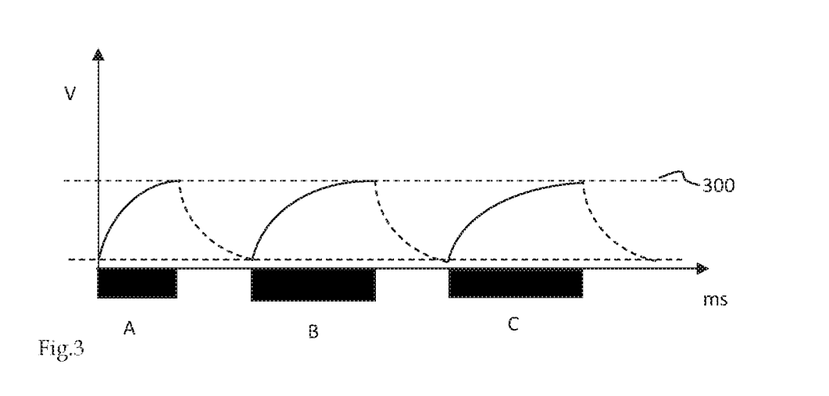
FIG. 3 shows a schematic representation of charging a capacitor to detect air bubbles.

FIG. 3 shows on the positive Y-axis the charging voltage V of the capacitor 31. A broken line 300 shows the stabilized voltage threshold level for loading and unloading the capacitor 31 controlled by the Zener diode circuit 32. The minus Y-axis shows the pulse pause pattern of the optocoupler device 35. The loading process "A" is without air bubbles wherein the capacitor charging process to the stabilized threshold value happens very fast. The loading process "B" is with minor amount of air bubbles wherein the capacitor charging process is with much longer duration than without air bubbles, and the capacitor charging process "C" with many air bubbles contamination in the water flow provides the prolonged charging time of the capacitor to the stabilized threshold value.

Figure 5:
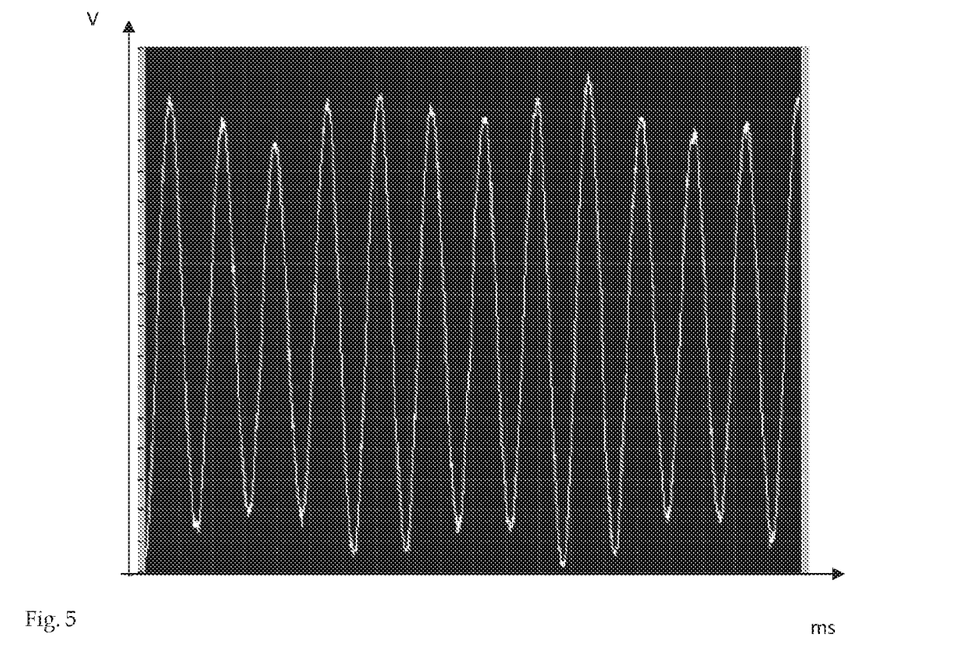
FIG. 5 shows a schematic representation of the result of a measurement with a minor amount of air bubbles.

The influence of air bubbles contamination on the conductivity value of the water is shown in the graph of FIG. 5 where the x axis shows the time and the y axis shows the leak current before it is rectified in the rectifier 30a. The measurement was done with 50 Hz AC voltage. The graph of FIG. 5 shows a period of time with some ms duration where air bubbles are released into the water supply of a water heater while the leak current was detected and monitored with a oscilloscope. A different amount of air bubbles in the water flow passing the electrode system creates a fluctuating leak current during the interval of passing air bubbles.

Figure 4:
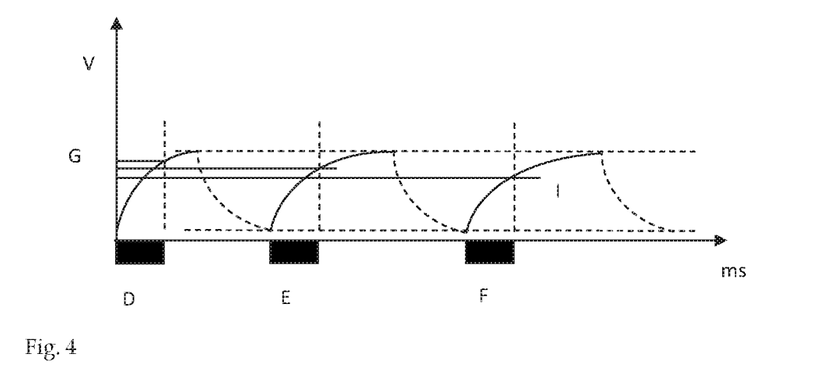
FIG. 4 shows a schematic representation of an alternative process to detect air bubbles.

FIG. 4 shows an alternate process to detect the air bubbles using a constant trigger time "D", "E" "F" and as a result of air bubbles the voltage level "G-I" of the capacitor 31 charge process at the end of the trigger time. The trigger time is in this embodiment of the invention a constant value and the charge voltage level is a variable measured value. The Voltage level "G" is without air bubbles, voltage level "I" with air bubbles.

Also, the conductivity of the water itself is a point of interest in order to avoid accidents caused by an electric shock due to highly conductive water.

For example, after a water mains supply maintenance the water may contain rust or salt which increases the conductivity of the water temporarily. A visual or an acoustic signal is generated by the electronic control system 2 to inform the user if there is a risk before the water heater starts heating. Over time, water conductivity in a specific water supply system will probably not change much. However, it can differ a great deal from location to location.

The conductivity of the water is also influenced by the water temperature.

Figure 6:
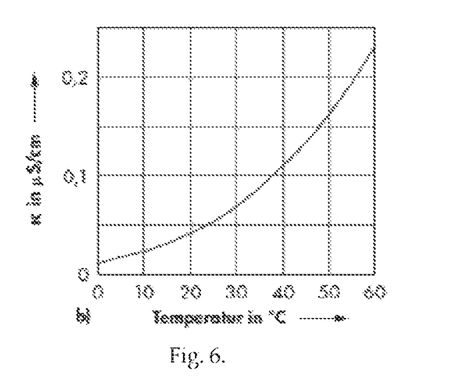
FIG. 6 shows a schematic representation of a specific conductivity of the water.

FIG. 6 shows that the specific conductivity of the water is doubled in a temperature range from 40° C. to 60 ° C. The amount increases from approximately 0.11 K in µS/cm to nearly 0.22 K in µS/cm. If the measured water conductivity need to be compared with a threshold value which is related to a set water temperature it is possible to compensate the water temperature influence on the measurement result of the water conductivity using the inverse function shown in FIG. 6. The measured value is corrected with conductivity at a certain water temperature level using the temperature information of sensor 12 or 13. This is executed in a software of the microprocessor 8 situated on the electronic control system 2. If the measured water conductivity need to be compared with a threshold value which is not related to a set water temperature the measurement result of the detected leak current can be utilized without any correction.

If an air bubble contamination event is picked-up during the heating process, leak current signal fluctuations take place, as shown in FIG. 5, the power supply to the heating element 18, 19, 20 may be reduced or completely interrupted.

If the conductivity of the water in this embodiment of the invention creates a leak current of more than 5 mA, a signal, for example visual or acoustic, will be generated.

In one embodiment of the invention a visual signal is generated on the electronic control system 2 and shown on the display.

If the leak current is more than a threshold value, for example 50 mA, the power supply from the triac to the heating element 18, 19, 20 will be interrupted immediately.

Figure 7:
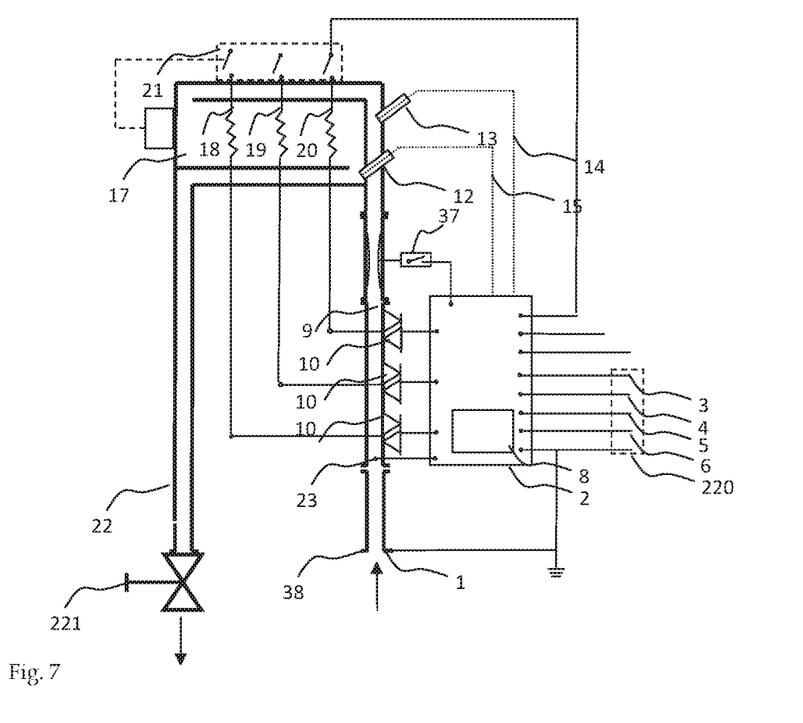
FIG. 7 shows a schematic representation of a water heater with venturi pressure switch activation.

In FIG. 7 a further advantageous configurations of this invention is shown.

FIG. 7 explains a configuration as shown in FIG. 1. Instead of the flow sensor device 11 there is a pressure switch 37 with a venturi nozzle which activates the electronic control system 2 if a hot water tap 221 is turned on. The cold water inlet tube 1 material is a non-conductive plastic material with a water immersed metallic grounded flange 38. It is possible that the outlet tube plastic material 22 and the inlet tube 1 plastic material is assembled in a single metallic grounded flange.

All of the named configurations in FIGS. 1, and 7 may be configured in a hydraulic parallel flow arrangement, sharing a single electronic temperature control system (PCB) board. The parallel hydraulic configuration may be integrated in a single housing.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims. In addition, it is noted that citation or identification of any document in this application is not an admission that such document is available as prior art to the present invention.

It is also noted that in this disclosure and particularly in the claims and/or paragraphs, terms such as "comprises", "comprised", "comprising" and the like can have the meaning attributed to it in US. Patent law; e.g., they can mean "includes", "included", "including", and the like; and that terms such as "consisting essentially of" and "consists essentially of" have the meaning ascribed to them in US. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 US.c. 112), such that applicant(s) reserve the right to disclaim, and hereby disclose a disclaimer of, any previously described product, method of making the product, or process of using the product.

The invention claimed is:

1. A tankless water heater, comprising:
   a fluid channel for guiding a fluid from an inlet to an outlet, said fluid channel comprising a cooling tube and a fluid heating chamber downstream from the cooling tube, said fluid heating chamber comprising a plurality of bare wire heating elements,
   an electronic control system,
   a bare wire heating element out of the plurality of bare wire heating elements acting as a first electrode, which is connected to the electronic control system,
   at least one triac configured for feeding the bare wire heating element with electrical power,
   said cooling tube is configured to cool the at least one triac,
   the fluid channel including a fluid heating chamber and a second electrode,
   wherein the cooling tube is the second electrode and is fitted at distinct distances from each of the plurality of bare wire heating elements,
   the electronic control system including an electronic leak current detecting circuit for detecting a value indicative of the conductivity of a fluid in the fluid channel between the first electrode and the second electrode,
   wherein the electronic leak current detecting circuit is connected by a wire to the second electrode and a reference pole, respectively,
   wherein the electronic leak current detecting circuit is configured to derive the value indicative of the conductivity of the fluid based on a current leaking from the first electrode,
   wherein the tankless water heater further comprises:
      an electric charge storing device connected to the electronic leak current detection circuit, and
      a signal transmission unit comprising a transmission device for transmitting a charging status of the electric charge storing device to the electronic leak current detection circuit of the electronic control system,
   wherein the electronic leak current detecting circuit is configured to derive the value indicative of the conductivity of the fluid based on the charging status, and
   wherein the electronic control system is configured to determine an amount of air bubbles between the bare wire heating element and the second electrode based on a time needed for charging the electric charge storing device.

2. The tankless water heater according to claim 1, wherein the electronic control system is configured to detect any presence of air bubbles between the bare wire heating element and the second electrode based on the value indicative of the conductivity of the fluid.

3. The tankless water heater according to claim 1, wherein the electric charge storing device comprises a rectifying circuit for rectifying an alternating leak current applied to the second electrode and for directing the direct current loads the electric charge storing device.

4. The tankless water heater according to claim 1, wherein the electronic control system is configured to monitor the water conductivity and to at least one of activate an alarm signal and shut off power supply to the bare wire heating element if the conductivity value exceeds a threshold value.

5. The tankless water heater according to claim 1, further comprising at least one sensor which is connected to the electronic control system, wherein the at least one sensor comprises at least one of
   a flow detection sensor for a flow detection of the fluid in the fluid channel,
   a temperature sensor for detecting outgoing hot water to control the temperature of the outgoing water, and
   a temperature sensor, for detecting an incoming cold water temperature,
   wherein the electronic control unit is configured to evaluate the value indicative of the conductivity of the fluid based on a value sensed by the at least one sensor.

6. A method of controlling a tankless water heater,
   wherein the tankless water heater comprises:
      a fluid channel for guiding a fluid from an inlet to an outlet, said fluid channel comprising a coolin tube and a fluid heating chamber downstream from the cooling tube, said fluid heating chamber comprising a plurality of bare wire heatin elements,
      an electronic control system,
      a bare wire heating element out of the plurality of bare wire heating elements acting as a first electrode which is connected to the electronic control system,
      at least one triac configured for feeding the bare wire heating element with electrical power,
      said cooling tube is configured to cool the at least one triac,
      the fluid channel including a fluid heating chamber and a second electrode,
      wherein the cooling tube is the second electrode and is fitted at distinct distances from each of the plurality of bare wire heating elements,
   the method comprising:
      measuring a leak current between the bare wire heating element and the second electrode using an electronic leak detection measuring circuit,
      deriving a value indicative of the conductivity of fluid in the fluid channel based on the measured leak current
      detecting at least one of a water inlet temperature, a water outlet temperature and an actual water flow rate with a sensor,
      evaluating the value indicative of the conductivity under consideration of the detected at least one of the water inlet temperature, the water outlet temperature and the actual water flow rate,
      detecting fluid parameters with at least one sensor,
      heating the water with at least one bare wire heating element to preset parameters, and
      controlling continuously, as required, the conditions of the outcoming water by a signal of the at least one sensor, wherein the controlling comprises:
         connecting at least one phase of an alternating current line with a switch to at least one bare wire heating element as soon as water flows, and
         measuring the leak current with the electronic leak detection measuring circuit which is connected to the second electrode by detecting a charge of an electric charge storing device which is electrically fed by a direct current, wherein the direct current is generated by rectifying an alternating leak current applied to the second electrode and the direct current loads the electric charge storing device.

7. The method of claim 6, further comprising the following steps:
detecting fluid parameters with at least one sensor,
heating the water with at least one heating element to preset parameters controlled with a signal of at least one sensor, and
adjusting continuously as required the conditions of the outcoming water as described below:
to detect the actual water flow rate with a sensor,
to detect any presence of air bubbles between at least one bare wire heating element and a plug-in electrode,
wherein the second electrode is connectable to the electronic leak detection measuring circuit and to a reference pole via the electronic leak detection measuring circuit,
wherein a leak current is routed to the reference pole to calculate water conductivity,
wherein the presence of air bubbles is detected based on the water conductivity.

8. The method of claim 6, further comprising:
feeding the leak current to an electric charge storing device,
monitoring a characteristic value of a charge of the electric charge storing device and
deactivating the electric supply to a bare heating wire as soon as the characteristic value exceeds a limit.

9. The method of claim 8, further comprising
detecting air bubbles in the fluid channel of the water heater to avoid overheating of the bare wires by analyzing the characteristic value, which is representative of a fluctuating water conductivity and temperature in order protect the heating element.

10. The method of claim 6, comprising maintaining a set point temperature by automatically controlling and adjusting, if necessary, a throttle valve and state-of-the-art electronics.

11. The method of claim 6, comprising a safety function implementing at least one of the following steps
monitor the water conductivity and to activate an alarm signal if the conductivity value exceeds a first threshold value,
monitor the water conductivity and to shut off the electric element supply of the water heater if the conductivity value exceeds a second threshold value above the first threshold value, and
monitor the water conductivity, even when the bare wire heating element is switched off, and to shut off the electric supply immediately if the detected leak current exceeds a third threshold value.

12. The method of claim 6, comprising
monitoring a water flow rate and temperature in order to at least one of a) to activate or b) to deactivate the electric power supply to the bare wire heating element and to calculate a power demand for at least one bare wire heating element depending on flow rate and a preset water temperature.

13. The tankless water heater according to claim 1, wherein the electric charge storing device includes a capacitor.

14. The method of claim 6, wherein the electric charge storing device includes a capacitor.

* * * * *

UNITED STATES PATENT AND TRADEMARK OFFICE
CERTIFICATE OF CORRECTION

PATENT NO. : 11,573,031 B2
APPLICATION NO. : 15/378720
DATED : February 7, 2023
INVENTOR(S) : Hubert Nolte et al.

Page 1 of 1

It is certified that error appears in the above-identified patent and that said Letters Patent is hereby corrected as shown below:

In the Claims

In Claim 1, Column 11, Line 14, the word "cooling" should be deleted.

In Claim 1, Column 11, Line 27, the word "cooling" should be deleted.

In Claim 6, Column 12, Line 23, the word "coolin" should read as --cooling--.

In Claim 6, Column 12, Line 25, the word "cooling" should be deleted.

In Claim 6, Column 12, Line 26, the word "heatin" should read as --heating--.

In Claim 6, Column 12, Line 37, the word "cooling" should be deleted.

Signed and Sealed this
Eighteenth Day of November, 2025

John A. Squires
*Director of the United States Patent and Trademark Office*